(No Model.)

W. ZOERB.
SPECTACLE OR EYEGLASS CASE.

No. 565,528.  Patented Aug. 11, 1896.

WITNESSES  INVENTOR

UNITED STATES PATENT OFFICE.

WILLIAM ZOERB, OF DEDHAM, MASSACHUSETTS, ASSIGNOR TO ELIZABETH ZOERB, OF SAME PLACE.

SPECTACLE OR EYEGLASS CASE.

SPECIFICATION forming part of Letters Patent No. 565,528, dated August 11, 1896.

Application filed April 1, 1896. Serial No. 585,782. (No model.)

*To all whom it may concern:*

Be it known that I, WILLIAM ZOERB, a citizen of the United States, residing in Dedham, in the county of Norfolk and State of Massachusetts, have invented a new and useful Improvement in Spectacle or Eyeglass Cases, of which the following is a specification.

This invention relates to rigid cases made for holding spectacles or eyeglasses and adapted to be carried in the pocket, and particularly to that style of case which consists of two members or leaves substantially oblong or elliptical in shape and hinged together, one leaf being practically concave.

The invention has for its principal object to so construct the case that the concave leaf will be prevented from being crushed and at the same time be capable of being locked to the other leaf by pressure and unlocked as desired, such construction not, however, interfering in any manner with the eyeglass or spectacles contained in the case.

The nature of the invention in detail is fully described below, and illustrated in the accompanying drawings, in which—

Figure 1:
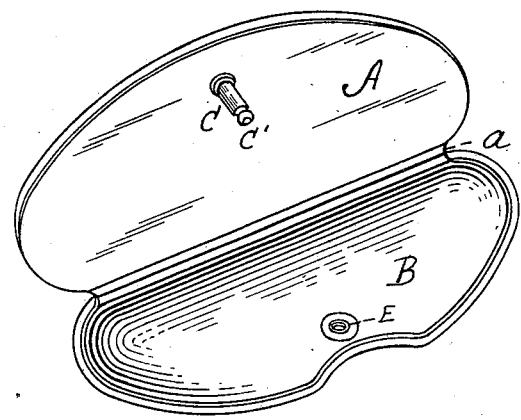
Figure 2:
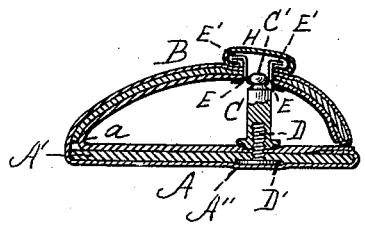

Figure 1 is a perspective view of a spectacle or eyeglass case embodying my improvement in an open position. Fig. 2 is a transverse central section of the same in a closed position.

Similar letters of reference indicate corresponding parts.

A represents the flat leaf, and B the concave leaf, the two being hinged together at *a* in the ordinary manner. The flat leaf is provided near its longitudinal center, but toward the outer edge thereof, with the rigid perpendicular post C, which is screwed upon the vertically-placed screw D, extending through the leaf A from the outer side thereof and provided with the head D', which lies between the body A' and the covering A'' of said leaf A on the under side of said portion A'. The upper end of this post C is formed into the ball or head C'.

The concave leaf B is provided with the spring-socket E, which is secured therein between the outer surface of the leaf B and a cap H, which embraces and whose edges are tucked under the flanges E' of the socket E.

The case is locked by pressing the socket upon and over the ball C' and snapping it into position. When in such position, the post C supports the concave or dome-shaped leaf B and prevents it from being crushed in, while said post is made high enough to support the concave leaf in a position which will leave ample space for the eyeglasses or spectacles to be contained within the case. Moreover, the post being small in diameter does not occupy sufficient space to in the least interfere with the glasses, especially as its location is such that it will be between the two lenses.

It should be understood that the ball C' and socket E are not claimed to be new in this invention in themselves considered.

Having thus fully described my invention, what I claim, and desire to secure by Letters Patent, is—

The herein-described improved spectacle and eyeglass case, consisting of the leaf A; the screw D extending up through said leaf from the outer side thereof and provided with the flat head D' located between the under side of the main portion of said leaf and the covering thereof; the post C extending up from said screw within the case toward the concave leaf and provided with the ball C' on its upper end; the concave leaf B provided with the spring-socket E; and the covering or guard H extending over, around and under the edges of the flange E' of said socket, whereby both the socket and the opening in the concave leaf for said socket are concealed, substantially as set forth.

WILLIAM ZOERB.

Witnesses:
HENRY W. WILLIAMS,
A. N. BONNEY.